US010970965B2

(12) United States Patent
Burillo et al.

(10) Patent No.: US 10,970,965 B2
(45) Date of Patent: Apr. 6, 2021

(54) SUGGESTION ENGINE FOR AFTERMARKET BROKERED WAGERS

(71) Applicant: Hedgekings LLC, Key Biscayne, FL (US)

(72) Inventors: Eduardo Burillo, Key Biscayne, FL (US); Jeffrey Gross, Key Biscayne, FL (US)

(73) Assignee: HEDGEKINGS LLC, Key Biscayne, FL (US)

( * ) Notice: Subject to any disclaimer, the term of this patent is extended or adjusted under 35 U.S.C. 154(b) by 0 days.

(21) Appl. No.: 16/428,328

(22) Filed: May 31, 2019

(65) Prior Publication Data

US 2020/0380821 A1 Dec. 3, 2020

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G06Q 50/00*** | (2012.01) |
| ***G06Q 50/34*** | (2012.01) |

(52) U.S. Cl.

CPC ......... *G07F 17/3244* (2013.01); *G06Q 50/01* (2013.01); *G06Q 50/34* (2013.01); *G07F 17/3262* (2013.01); *G07F 17/3288* (2013.01)

(58) Field of Classification Search

USPC .............................. 463/1, 20, 22, 25, 39, 40

See application file for complete search history.

(56) References Cited

U.S. PATENT DOCUMENTS

| | | | | |
|---|---|---|---|---|
| 2005/0171878 | A1* | 8/2005 | Pennock ................ | G06Q 40/00 705/35 |
| 2009/0023493 | A1 | 1/2009 | Cheng et al. | |
| 2009/0313144 | A1 | 12/2009 | Kadikar | |
| 2014/0274291 | A1* | 9/2014 | Elias ....................... | G07F 17/34 463/20 |
| 2015/0228160 | A1 | 8/2015 | Georgiopoulos et al. | |
| 2017/0221308 | A1 | 8/2017 | Lakhotia | |

* cited by examiner

*Primary Examiner* — Adetokunbo O Torimiro

(74) *Attorney, Agent, or Firm* — Steven M. Greenberg, Esq.; Shutts & Bowen LLP

(57) ABSTRACT

A suggestion method for aftermarket brokered wagers includes selecting a subscriber to an aftermarket brokered wager computing system and determining at least one profile characteristic for the subscriber. Thereafter, a set of available wagers owned by other subscribers are filtered according to the determined profile characteristic to produce a recommended wager owned by a specific one of the other subscribers. Consequently, a message is pushed to a mobile device of the selected subscriber recommending a fractional purchase of the recommended wager at odds established at a time of acquisition of the recommended wager irrespective of contemporaneous odds for the recommended wager. In response to the acceptance of the recommended fractional purchase by the selected subscriber, a registry entry is then written in the brokered wager computing system denoting a fractional ownership of the recommended wager by the selected subscriber along with the specific one of the other subscribers.

18 Claims, 2 Drawing Sheets

SUGGESTION ENGINE FOR AFTERMARKET BROKERED WAGERS

BACKGROUND OF THE INVENTION

Field of the Invention

The present invention relates to the field online wagering and bet brokering and more particularly to secondary markets for trading online wagers.

Description of the Related Art

Online wagering, also known as online gambling, has existed in several forms for several decades. Generally speaking, online wagering refers to the placement of wagers or bets through a computer interface by way of a remote automated process over a computer communications network such as the global Internet. Online wagering supports many different types of gambling activities including games of chance—particularly card and dice games, online virtual slot machines, pari-mutuel contests and sports wagering. In connection with sports wagering, individual gamblers may directly place bets with a centralized sports book, or the individual gamblers may indirectly place bets through a clearing house in which bets are brokered—so called bet brokering operations.

In general, in the context of sports gambling, a wager is placed in consideration of a cash payment and in connection with a prediction of a specific contingency—an occurrence of an event such as a particular individual or team winning or losing a particular competition, a particular score resulting from a particular competition, or a number or frequency of actions or outcomes that occur during the course of a particular competition. Indeed, sports gambling is not limited to sporting events as wagers likewise can be place on nearly any contest such as a political contest, or an artistic performance. Irrespective of the nature of the contingency of a wager, in most instances, the wager is purchased by the bettor providing funds to the facilitator of the bet, in consequence of which the bettor receives a document, electronic or physical, that specifies the contingency of the wager and the odds associated with the wager.

Of course, to the extent that the wager is placed through a middleman, a small portion of the wager is reserved as a commission for the middleman. Importantly, as it is widely understood, the odds associated with a wager once placed, may change depending upon external circumstances which may influence the probability of the outcome of the wager. As well, the odds associated with a wager may fluctuate depending upon the volume and nature of other wagers placed upon the same criteria by other betters indicating a crowd-sourced mentality of the probability of the associated contingency occurring.

Notably, for a single wager, for most bettors, once the wager has been purchased, no changes are required and the bettor may simply await the outcome to learn of the better has lost the wager, or if the better has won the wager. But, for some wagers, the comfort level of holding particular wagers can vary. To wit, in some instances, a bettor may feel overextended with too many wagers in play, whereas in other instances, the better may lose confidence in a particular wager where the odds have changed for the particular wager since the acquisition of the wager. However, once the wager has been placed, little can be done aside from seeking private secondary market transactions of the complete wager aimed at the sale of the entire wager to a purchaser willing to pay either a premium or a discounted rate for an existing wager depending upon the differential between the odds at the time of acquisition of the wager and the time of re-sale.

BRIEF SUMMARY OF THE INVENTION

Embodiments of the present invention address deficiencies of the art in respect to the aftermarket brokering of wagers and provide a novel and non-obvious method, system and computer program product for a suggestion engine for aftermarket brokered wagers. In an embodiment of the invention a suggestion method for aftermarket brokered wagers includes selecting a subscriber to an aftermarket brokered wager computing system and determining at least one profile characteristic of the selected subscriber. Thereafter, a set of available wagers owned by other subscribers to the aftermarket brokered wager computing system and registered with the wager computing system may be filtered according to the determined profile characteristic to produce a recommended wager owned by a specific one of the other subscribers. Consequently, a message may be pushed to a mobile device of the selected subscriber recommending a fractional purchase of less than a complete portion of the recommended wager at odds established at a time of acquisition of the recommended wager irrespective of contemporaneous odds for the recommended wager. In response to the acceptance of the recommended fractional purchase by the selected subscriber, a registry entry is then written in the brokered wager computing system denoting a fractional ownership of the recommended wager by the selected subscriber along with the specific one of the other subscribers.

In one aspect of the embodiment, the profile characteristic of the selected subscriber is a geographic location assigned to the selected subscriber. In another aspect of the embodiment, the profile characteristic of the selected subscriber is a wager type. In yet another aspect of the embodiment, the profile characteristic of the selected subscriber is a favorite team assigned to the selected subscriber. In even yet another aspect of the embodiment, the profile characteristic of the selected subscriber is a social media connection assigned to the selected subscriber. In a final aspect of the embodiment, in response to the acceptance of the recommended fractional purchase by the selected subscriber, a recommended purchase price is computed for the recommended wager and a message transmitted to the specific one of the other subscribers proposing a fractional purchase of the recommended wager at the recommended purchase price. In response to an acceptance by the specific one of the other subscribers of the proposed fractional purchase of the recommended wager by the selected subscriber, the registry entry is then written.

In another embodiment of the invention, a data processing system is configured for suggesting aftermarket brokered wagers. The system includes a host computing system of one or more computers, each with memory and at least one processor. The system also includes a data storage device storing a database of subscribers and wagers. The system yet further includes an aftermarket brokered wager computing system adapted to receive registration requests by different ones of the subscribers buying and selling wagers to one another and to respond to the requests by writing to the database records indicating ownership of the different wagers. Finally, the system includes a recommendation engine.

The recommendation engine includes computer program instructions executing in the memory of the host computing system and enabled to select one of the subscribers and to determine at least one profile characteristic of the selected one of the subscribers. The instructions also are enabled to filter in accordance with the determined profile characteristic, a set of available ones of the wagers owned by others of the subscribers, the filtering producing a recommended wager owned by a specific one of the others of the subscribers. The instructions are yet further enabled to push a message to a mobile device of the selected one of the subscribers recommending a fractional purchase of less than a complete portion of the recommended wager at odds established at a time of acquisition of the recommended wager irrespective of contemporaneous odds for the recommended wager. Finally, in response to an acceptance of the recommended fractional purchase by the selected one of the subscribers, the instructions are enabled to write a record in the database denoting a fractional ownership of the recommended wager by the selected one of the subscribers along with the specific one of the other one of the subscribers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for suggesting a purchase of a portion of an aftermarket brokered wager. In accordance with an embodiment of the invention, different subscribers subscribe to an aftermarket brokered wagering system and different wagers held by ones of the subscribers are a registered with the system. From time to time, different ones of the subscribers are selected for receiving a suggestion of a recommended wager. In this regard, a profile characteristic of the selected subscriber such as a geographic location or favorite sports team is determined and one or more of the wagers available for fractional resale are identified that match the profile characteristic of the selected subscriber. Thereafter, at least one of the determined wagers owned by an existing one of the subscribers may be recommended to the selected subscriber for fractional purchase by way of a push message to the mobile device of the selected subscriber. In the event the selected subscriber agrees to the fractional purchase, a record is written in the system indicating a fractional ownership of the recommended wager by both the selected subscriber and the existing one of the subscribers.

Figure 1:
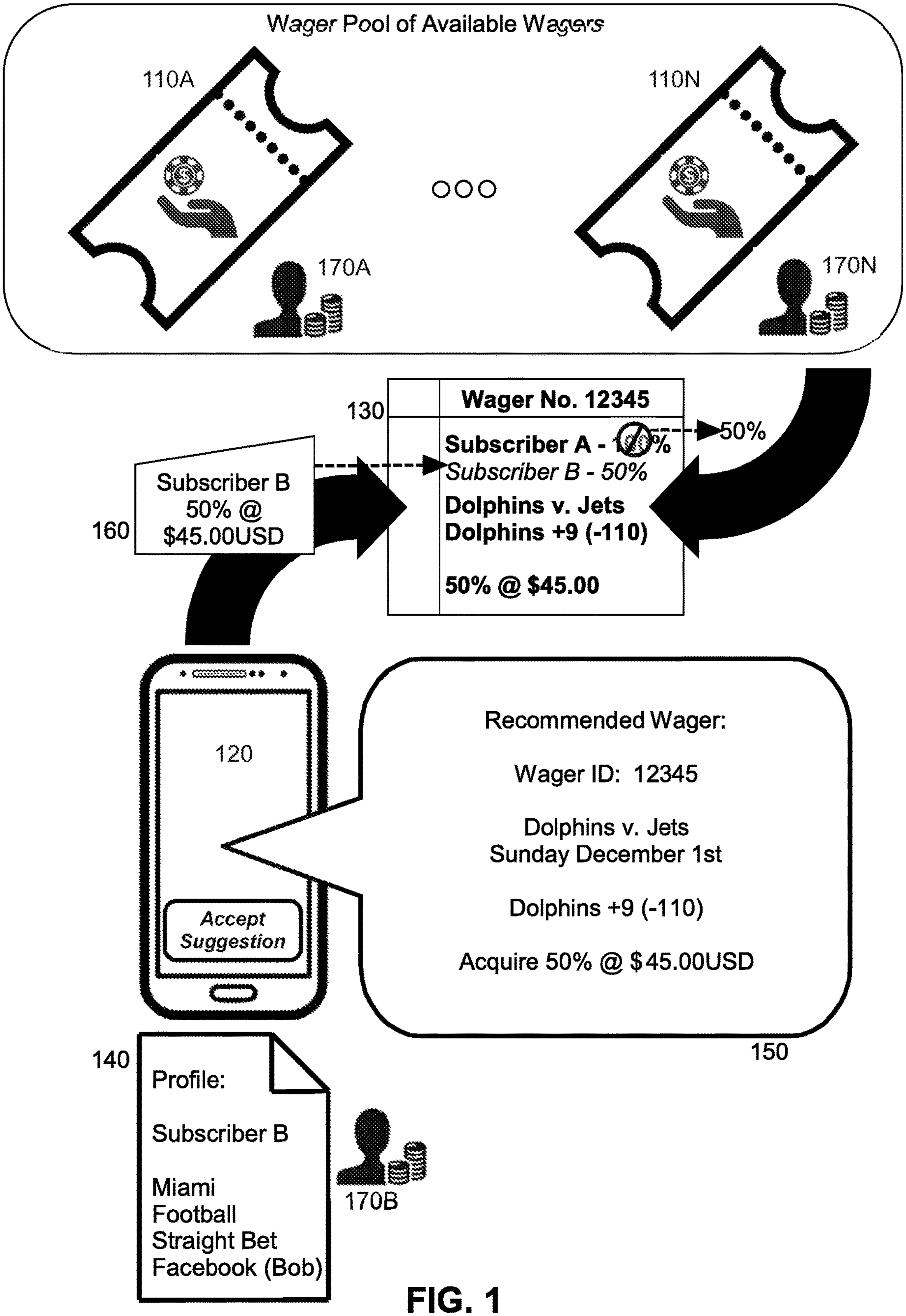
FIG. 1 is a pictorial illustration of a process for suggesting a purchase of a portion of an aftermarket brokered wager.

In further illustration, FIG. 1 pictorially shows a process for suggesting a purchase of a portion of an aftermarket brokered wager. As shown in FIG. 1 different subscribers 170A, 170B, 170N are registered with an aftermarket brokered wagering system along with different pre-existing wagers 110A, 110N. Each of the subscribers 170A, 170B, 170N includes a subscriber profile 140 that specifies different profile characteristics, for instance, a geographic location, a favorite activity in connection with which wagers are often placed, and a type of wager frequently placed. Optionally, the profile 140 includes a listing of one or more social networks to which a corresponding one of the subscribers 170A, 170B, 170N belongs, and as a further option, a listing of social media contacts who are also ones of the subscribers 170A, 170B, 170N of the aftermarket brokered wagering system.

Periodically, a selected subscriber 170B, amongst the subscribers 170A, 170B, 170N is processed in respect to a corresponding profile 140 retrieved for the selected subscriber 170B. Each of the wagers 110A, 110N registered in the aftermarket brokered wagering system is then compared to the corresponding profile 140 in order to select one of the wagers 110A, 110N most likely to be of interest to the selected subscriber 170B. For example, one of the wagers 110A, 110N may be selected because the selected one of the wagers 110A, 110B pertains to an event occurring in connection with the location of the corresponding profile 140, or to a sporting team associated with the location of the corresponding profile 140, or to a type of bet associated with the preferred type of bet of the corresponding profile 140. Optionally, the selected one of the wagers 110A, 110B is selected because the selected one of the wagers 110A, 110B is owned by a social media contact of the selected subscriber 170B, or the selected one of the wagers 110A, 110B is determined to be similar to another of the wagers 110A, 110N held by a social media contact of the selected subscriber 170B.

Once the aftermarket brokered wagering system has selected a particular one of the wagers 110A, 110N as a recommended wager, a record 130 stored in the aftermarket brokered wagering system for the recommended wager is retrieved and a message 150 pushed to a mobile device 120 of the selected subscriber 170B indicating the content of the record 130 along with a proposal to purchase a fractional portion of the recommended wager at a specified price. To the extent that the selected subscriber 170B transmits a reply 160 to the aftermarket brokered wagering system accepting a fractional purchase of the recommended wager, the record 130 is modified to indicate split ownership of the wager as between the selected subscriber 170B and another of the subscribers 170A, 170N. In this way, each of the subscribers 170A, 170B, 170N are able to fine tune an acceptable risk of holding different ones of the wagers 110A, 110N without being required to divest fully of held ones of the wagers 110A, 110N or to purchase in full a complete one of the wagers 110A, 110N, and without requiring each of the subscribers 170A, 170B, 170N to maintain a constant awareness of all of the wagers 110A, 110N even though many of the wagers 110A, 110N may be of little personal interest.

Figure 2:
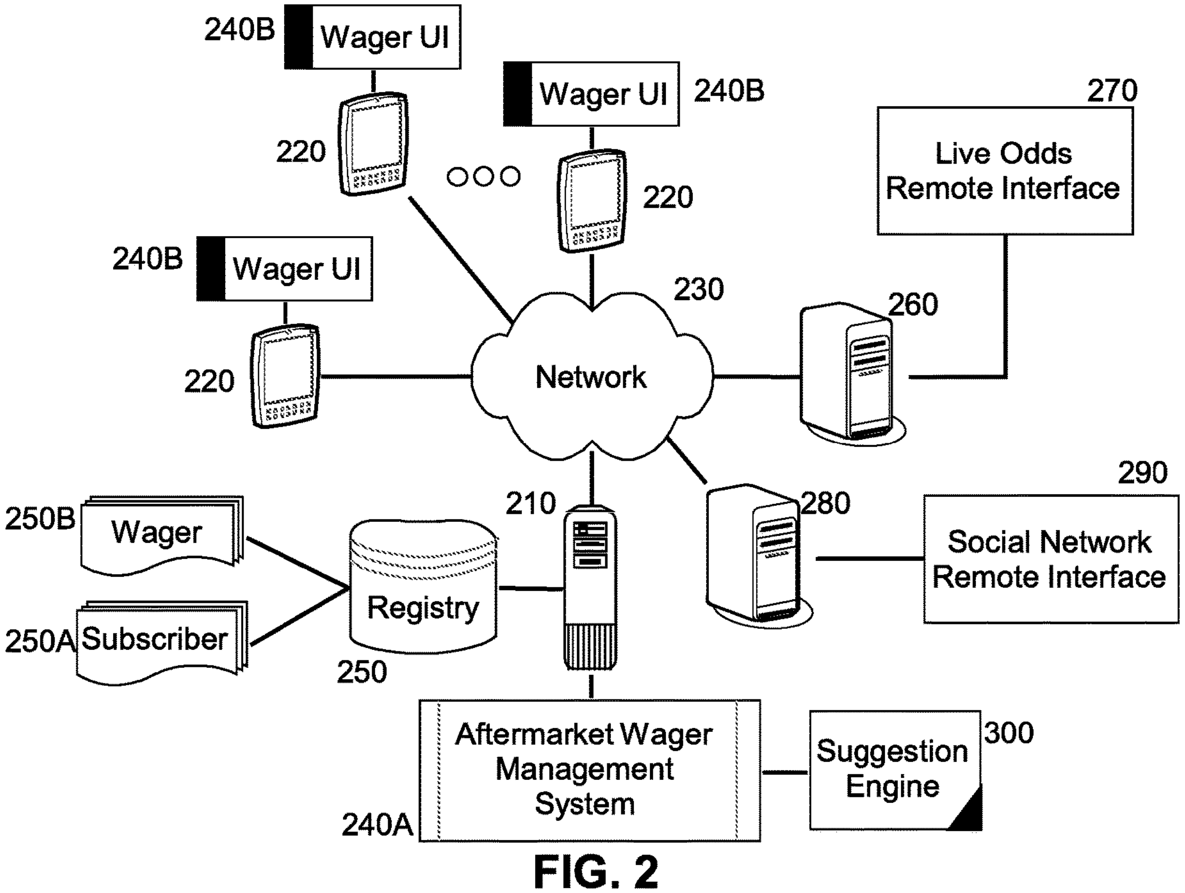
FIG. 2 is a schematic illustration of a data processing system configured to suggest a purchase of a portion of an aftermarket brokered wager; and, FIG. 3 is a flow chart illustrating a process for suggesting a purchase of a portion of an aftermarket brokered wager.

The process described in connection with FIG. 1 may be implemented in a data processing system. In yet further illustration, FIG. 2 schematically shows a data processing system configured to suggest a purchase of a portion of an aftermarket brokered wager. The system includes a host computing platform 210 that includes one or more computers, each with memory and at least one processor. The host computing platform 210 supports the operation of an aftermarket wager management system 240A coupled to a registry 250 of existing wagers 250B held by different registered subscribers 250A. The aftermarket wager management system 250A permits the subscribers 250A to re-sell ones of the wagers 250B to one another from over a computer communications network 230 through respectively different mobile computing devices 220 each sporting a user interface 240B to the aftermarket wager management system 240A.

Notably, a suggestion engine 300 is coupled to the aftermarket wager management system 240A. The suggestion engine 300 includes computer program instructions that when executing in the memory of the host computing platform 210, are enabled to select one of the subscribers 250A and determine a profile for the selected one of the subscribers 250A. Optionally, the computer program instructions yet further are enabled to access a social networking computing system 280 through social network remote interface 290 permitting queries to the social networking computing system 280. The queries, for instance, permit the identification of social media contacts of the selected one of the subscribers 250A and also personal interests of the selected one of the subscribers 250A. In the latter instance, the queries permit the retrieval of social media posts of the selected ones of the subscribers 250A and the posts of the identified social media contacts, the parsing of the posts and, through natural language processing, the identification of specific terms corresponding to specific interests such as often mentioned sports teams, political candidates and contests, geographic locations and the like. As well, hashtag or other meta data classifying posts may be processed to identify specific terms corresponding to specific interests.

The computer program instructions are further enabled to filter the wagers 250B according to the profile in order to select a recommended one of the wagers 250B most likely to be interesting to the selected one of the subscribers 250A. In this regard, different aspects of each of the wagers 250B can be compared to individual characteristics of the selected one of the subscribers 250A in order to identify ones of the wagers 250B with aspects matching the individual characteristics. Each of the characteristics further can be weighted so that the one of the wagers 250B matching the aspects the most (after weighting) becomes the recommended one of the wagers 250B.

The program instructions yet further are enabled to access an online wager booking system 260 through a live odds remote interface 270. The live odds remote interface 270 permits a querying of the online wager booking system 260 with the recommended one of the wagers 250B in order to determine current odds for the recommended one of the wagers 250B. Based upon the current odds and, in comparison to the odds previously assigned to the recommended one of the wagers 250B, the program instructions are enabled to compute pricing for a fraction of the recommended one of the wagers 250B. For instance, in the event that the odds for the recommended one of the wagers 250B have improved from the original odds, the program instructions present a price for a fraction of the recommended one of the wagers 250B that is greater than the fraction of the original price of the recommended one of the wagers 250B. Conversely, in the event that the odds for the recommended one of the wagers 250B have worsened from the original odds, the program instructions present a price for a fraction of the recommended one of the wagers 250B that is less than the fraction of the original price of the recommended one of the wagers 250B.

Once pricing has been determined for the recommended one of the wagers 250B, the program instructions are enabled to transmit a prompt to one of the mobile computing devices 220 of the selected one of the subscribers 250A through a corresponding user interface 240B. The prompt includes a suggestion to purchase a fractional portion of the recommended one of the wagers 250B—that is, less than the whole of the recommended one of the wagers 250B so that the selected one of the subscribers 250A co-owns the recommended one of the wagers 250B with a different one of the subscribers 250A. Responsive to the selected one of the subscribers 250A accepting the suggestion, the program instructions modify the record in the registry 250 of the recommended one of the wagers 250B indicating a fractional ownership thereof by the selected one of the subscribers 250A and payment is processed on behalf of the selected one of the subscribers 250A for the benefit of the different one of the subscribers 250A.

Figure 3:
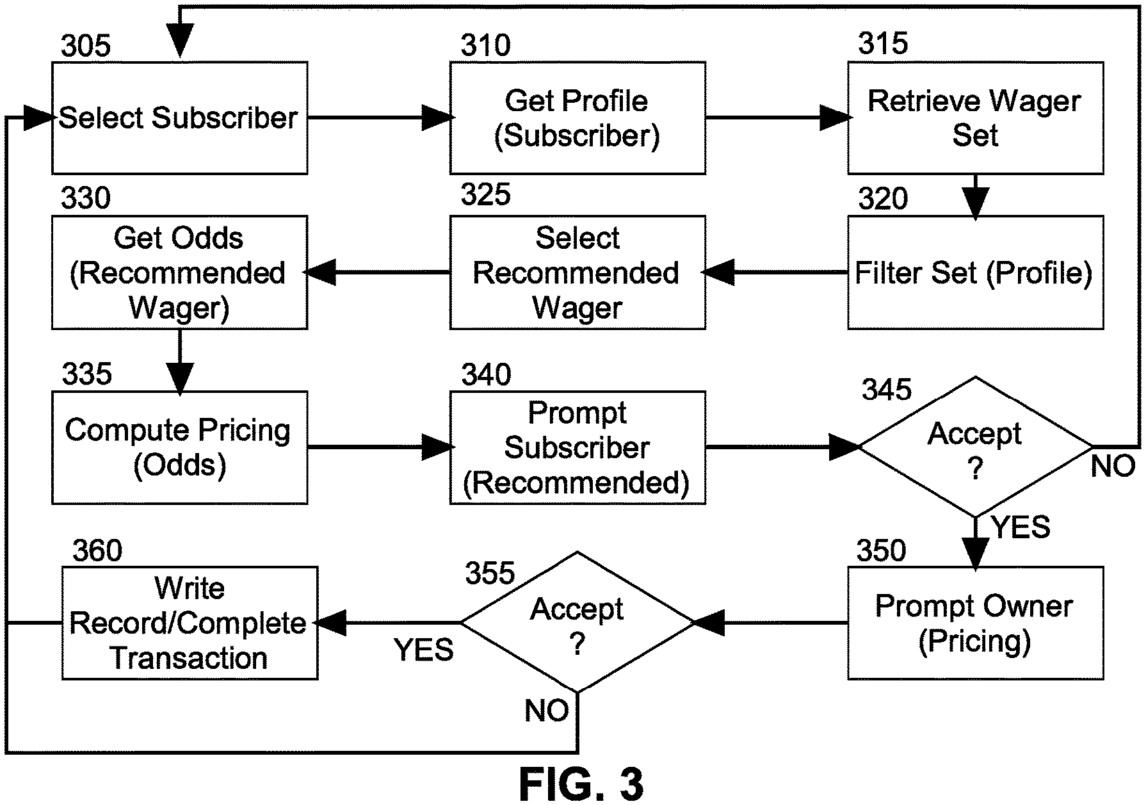

In even further illustration of the operation of the suggestion engine 300, FIG. 3 is a flow chart illustrating a process for suggesting a purchase of a portion of an aftermarket brokered wager. Beginning in block 305, a subscriber registered with the aftermarket wager management system is selected and in block 310, a profile for the selected subscriber is retrieved. In block 315, a set of wagers posted for re-sale are retrieved and in block 320, the set of wagers is filtered according to the profile. In block 325, one or more of the wagers in the filtered set are selected as recommended wagers and in block 330, the odds for the recommended wager or wagers are determined. Based upon the odds, in block 335, pricing is computed for each of the recommended wagers.

In block 340, a prompt is generated for display in a mobile device of the selected one of the subscribers. The prompt includes a listing of the recommended wager or wagers and corresponding computed pricing, with a user interface control for each recommended wager in the listing permitting an indication of acceptance of a corresponding one of the recommended wagers. In decision block 345, if the selected one of the subscribers accepts one of the recommended wagers, in block 350, the different one of the subscribers presently owning the accepted one of the recommended wagers is prompted to permit the fractional purchase of the accepted one of the recommended wagers. In decision block 355, if the different one of the subscribers accepts the fractional purchase, then in block 360 a record is written showing the fractional ownership of the accepted one of the recommended wagers.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A suggestion method for aftermarket brokered wagers comprising:
- selecting a subscriber to an aftermarket brokered wager computing system;
- determining at least one profile characteristic of the selected subscriber;
- filtering in accordance with the determined profile characteristic, a set of available wagers owned by other subscribers to the aftermarket brokered wager computing system and registered with the wager computing system, the filtering producing a recommended wager owned by a specific one of the other subscribers;
- pushing a message to a mobile device of the selected subscriber recommending a fractional purchase of less than a complete portion of the recommended wager at odds established at a time of acquisition of the recommended wager irrespective of contemporaneous odds for the recommended wager; and,
- responsive to an acceptance of the recommended fractional purchase by the selected subscriber, writing a registry entry in the brokered wager computing system denoting a fractional ownership of the recommended wager by the selected subscriber along with the specific one of the other subscribers.

2. The method of claim 1, wherein the profile characteristic of the selected subscriber is a geographic location assigned to the selected subscriber.

3. The method of claim 1, wherein the profile characteristic of the selected subscriber is a wager type.

4. The method of claim 1, wherein the profile characteristic of the selected subscriber is a favorite team assigned to the selected subscriber.

5. The method of claim 1, wherein the profile characteristic of the selected subscriber is a social media connection assigned to the selected subscriber.

6. The method of claim 1, wherein in response to the acceptance of the recommended fractional purchase by the selected subscriber:
- computing a recommended purchase price for the recommended wager;
- transmitting a message to the specific one of the other subscribers proposing a fractional purchase of the recommended wager at the recommended purchase price; and, responsive to an acceptance by the specific one of the other subscribers of the proposed fractional purchase of the recommended wager by the selected subscriber, writing the registry entry.

7. A data processing system configured for suggesting aftermarket brokered wagers, the system comprising:

a host computing system comprising one or more computers, each with memory and at least one processor;

a data storage device storing a database of subscribers and wagers;

an aftermarket brokered wager computing system adapted to receive registration requests by different ones of the subscribers buying and selling wagers to one another and to respond to the requests by writing to the database records indicating ownership of the different wagers; and, a recommendation engine comprising computer program instructions executing in the memory of the host computing system and enabled to perform:

selecting one of the subscribers;

determining at least one profile characteristic of the selected one of the subscribers;

filtering in accordance with the determined profile characteristic, a set of available ones of the wagers owned by others of the subscribers, the filtering producing a recommended wager owned by a specific one of the others of the subscribers;

pushing a message to a mobile device of the selected one of the subscribers recommending a fractional purchase of less than a complete portion of the recommended wager at odds established at a time of acquisition of the recommended wager irrespective of contemporaneous odds for the recommended wager; and, responsive to an acceptance of the recommended fractional purchase by the selected one of the subscribers, writing a record in the database denoting a fractional ownership of the recommended wager by the selected one of the subscribers along with the specific one of the other one of the subscribers.

8. The system of claim 7, wherein the profile characteristic of the selected one of the subscribers is a geographic location assigned to the selected one of the subscribers.

9. The system of claim 7, wherein the profile characteristic of the selected one of the subscribers is a wager type.

10. The system of claim 7, wherein the profile characteristic of the selected one of the subscribers is a favorite team assigned to the selected one of the subscribers.

11. The system of claim 7, wherein the profile characteristic of the selected one of the subscribers is a social media connection assigned to the selected one of the subscribers.

12. The system of claim 7, wherein in response to the acceptance of the recommended fractional purchase by the selected one of the subscribers:

computing a recommended purchase price for the recommended wager;

transmitting a message to the specific one of the other one of the subscribers proposing a fractional purchase of the recommended wager at the recommended purchase price; and, responsive to an acceptance by the specific one of the other one of the subscribers of the proposed fractional purchase of the recommended wager by the selected one of the subscribers, writing the record.

13. A computer program product for suggesting aftermarket brokered wagers, the computer program product including a non-transitory computer readable storage medium having program instructions embodied therewith, the program instructions executable by a device to cause the device to perform a method including:

selecting a subscriber to an aftermarket brokered wager computing system;

determining at least one profile characteristic of the selected subscriber;

filtering in accordance with the determined profile characteristic, a set of available wagers owned by other subscribers to the aftermarket brokered wager computing system and registered with the wager computing system, the filtering producing a recommended wager owned by a specific one of the other subscribers;

pushing a message to a mobile device of the selected subscriber recommending a fractional purchase of less than a complete portion of the recommended wager at odds established at a time of acquisition of the recommended wager irrespective of contemporaneous odds for the recommended wager; and, responsive to an acceptance of the recommended fractional purchase by the selected subscriber, writing a registry entry in the brokered wager computing system denoting a fractional ownership of the recommended wager by the selected subscriber along with the specific one of the other subscribers.

14. The computer program product of claim 13, wherein the profile characteristic of the selected subscriber is a geographic location assigned to the selected subscriber.

15. The computer program product of claim 13, wherein the profile characteristic of the selected subscriber is a wager type.

16. The computer program product of claim 13, wherein the profile characteristic of the selected subscriber is a favorite team assigned to the selected subscriber.

17. The computer program product of claim 13, wherein the profile characteristic of the selected subscriber is a social media connection assigned to the selected subscriber.

18. The computer program product of claim 13, wherein in response to the acceptance of the recommended fractional purchase by the selected subscriber:

computing a recommended purchase price for the recommended wager;

transmitting a message to the specific one of the other subscribers proposing a fractional purchase of the recommended wager at the recommended purchase price; and, responsive to an acceptance by the specific one of the other subscribers of the proposed fractional purchase of the recommended wager by the selected subscriber, writing the registry entry.

* * * * *